United States Patent [19]

Franks

[11] 3,980,883

[45] Sept. 14, 1976

[54] X-RAY DIFFRACTION GRATINGS

[75] Inventor: Albert Franks, London, England

[73] Assignee: National Research Development Corporation, London, England

[22] Filed: Oct. 3, 1975

[21] Appl. No.: 619,358

Related U.S. Application Data

[63] Continuation-in-part of Ser. No. 469,867, May 14, 1974, abandoned.

[30] Foreign Application Priority Data

May 15, 1973 United Kingdom .............. 23103/73

[52] U.S. Cl. ................................ 250/272; 250/273

[51] Int. Cl.[2] ........................................ G01N 23/20

[58] Field of Search ........... 250/272, 273, 274, 510

[56] References Cited

OTHER PUBLICATIONS

"Physical Structure & Diffraction Performance of Laminar X-ray Grating" - Thesis by John Michael Bennett, Mar. 1971 (University of London, Dept. of Physics).

*Primary Examiner*—Harold A. Dixon

*Attorney, Agent, or Firm*—Cushman, Darby & Cushman

[57] ABSTRACT

An x-ray diffraction grating consisting of a structure having a surface capable of reflecting x-rays, said surface being grooved so that in cross-section the profile of said surface alternates regularly between geometrically similar lines, in which the height of the alternation varies significantly over the area of the surface. The grating may be plane or curved; the variation in height may occur as a single step, a plurality of steps or may be continuous; the variation may occur either transverse to or parallel to the grooving.

1 Claim, 7 Drawing Figures

X-RAY DIFFRACTION GRATINGS

This application is a Continuation-in-Part of our copending application Ser. No. 469,867 filed May 14th, 1974, now abandoned.

This invention relates to laminar diffraction gratings for the analysis of x-rays.

Such diffraction gratings, which may also be referred to as phase gratings, are well known and consist of a structure having a surface capable of reflecting x-rays, the surface being grooved so that in cross-section the surface profile alternates regularly between geometrically similar lines. The x-rays must be incident at very small angles, i.e. grazing incidence. The surface may be plane, in which case the geometrically similar lines are parallel straight lines; alternatively the surface may be of spherical form, in which case the geometrically similar lines are arcs of concentric circles. It is also feasible to use more complex curved surfaces such as surfaces of cylindrical or conical form.

For both plane and curved surfaces the grooving may comprise a plurality of grooves; in the case of a fully cylindrical or conical surface, the grooving may alternatively comprise a single helical groove.

Some methods of making masters for such gratings are described in U.S. Pat Nos. 3,388,735 and 3,585,121 corresponding to British Pat. Nos. 1,080,364 and 1,226,018.

Figure 1:
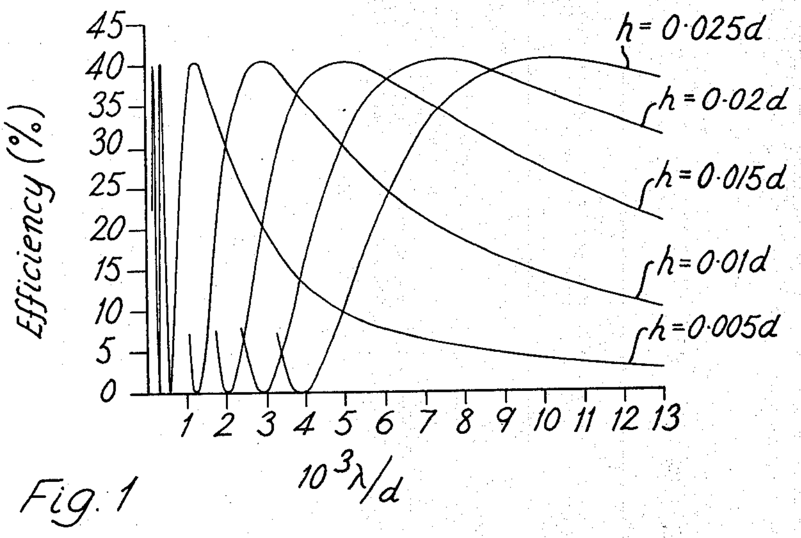
Figure 2A:
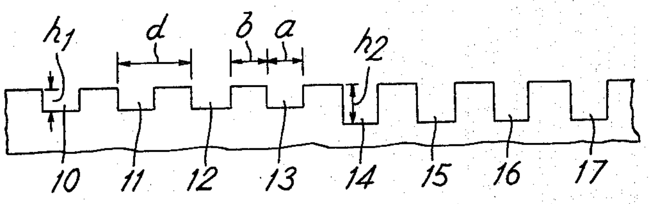
Figure 2B:
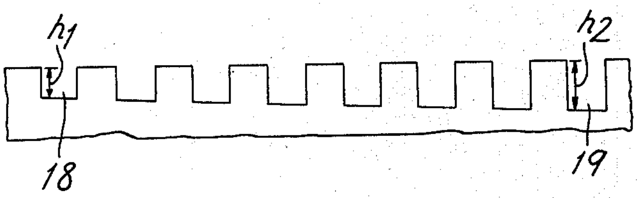
Figure 4A:
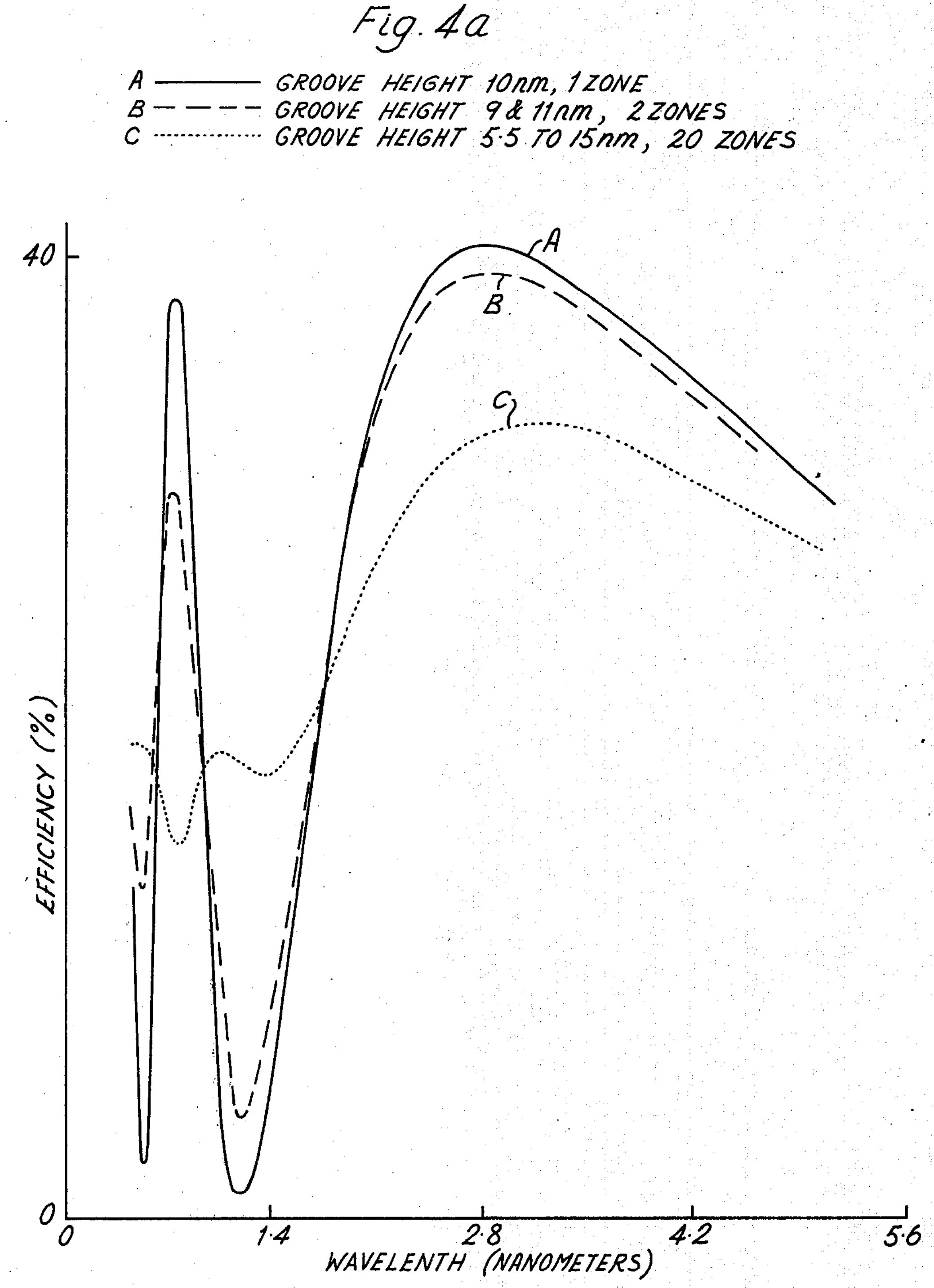
Figure 4B:
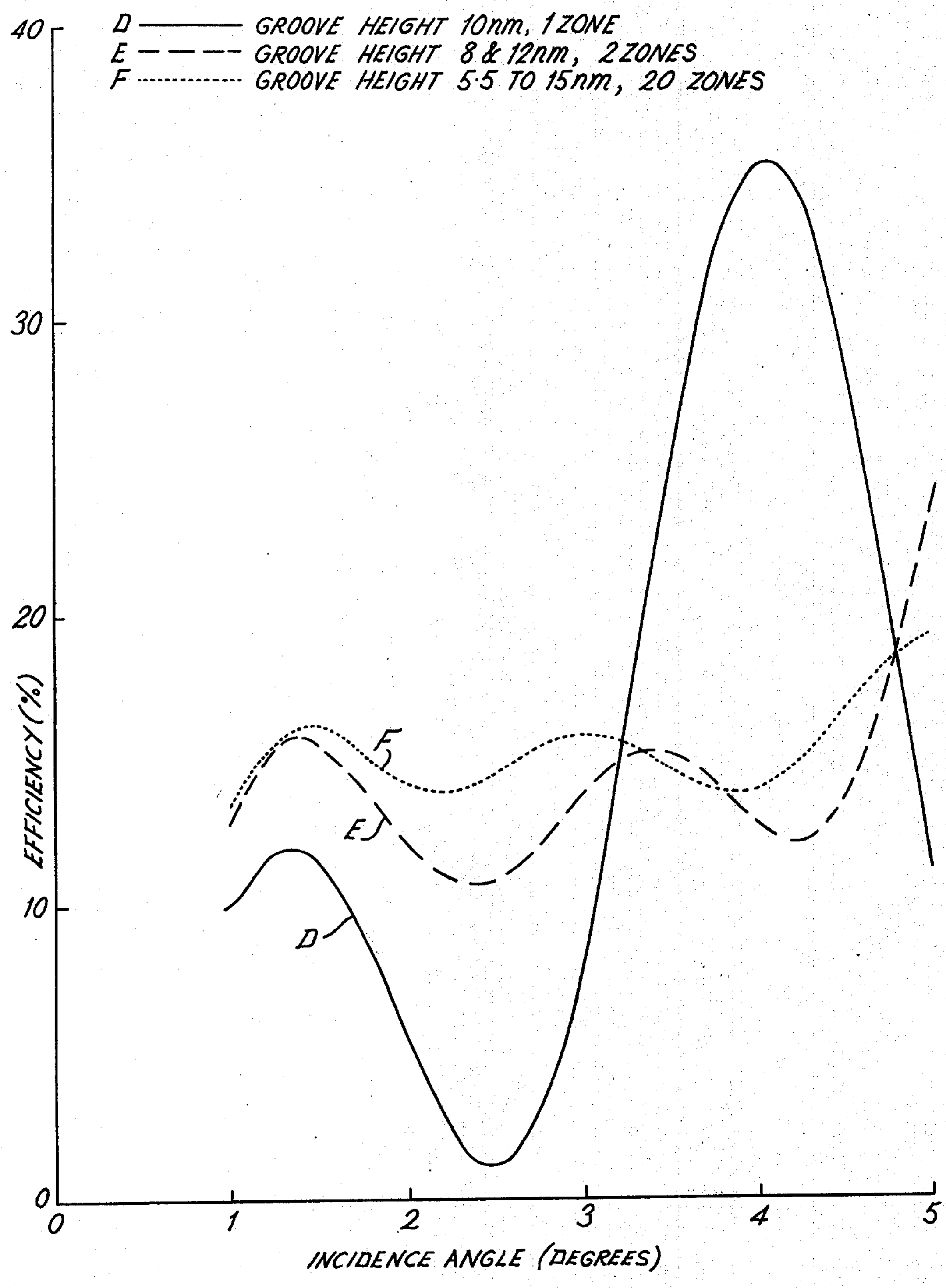

In the accompanying drawings:

FIG. 1 is an explanatory diagram relating to prior art phase gratings;

FIGS. 2(*a*), 2(*b*), 3(*a*), and 3(*b*) illustrate the profiles of four types of phase grating according to the present invention; and FIGS. 4(*a*) and 4(*b*) are explanatory diagrams relating to phase gratings according to the present invention.

One advantage of a phase grating of conventional type is that, by choice of suitable land width and grooving width and grooving depth, beams reflected from the grooving and lands may be made to interfere destructively for the totally reflected or zero order beam, and constructively for a chosen order, usually the first order, so as to enhance the geometrical diffraction efficiency in that order. The geometrical diffraction efficiency of an order is defined as the ratio of the intensity of the diffracted beam in that order and the intensity of the incident beam, assuming that the reflectivity is 100%. A full explanation of phase gratings may be found in the Proceedings of the Sixth International Conference on X-ray Optics and Microanalysis, University of Tokyo Press 1972, in a paper entitled "NPL X-ray Gratings and their Applications," by the present inventor, and in the Philosophical Transactions of the Royal Society of London, Part A, Volume 277, No. 1271, pages 503 to 543, 1975 in a paper of which the present inventor is coauthor.

Figure 3A:
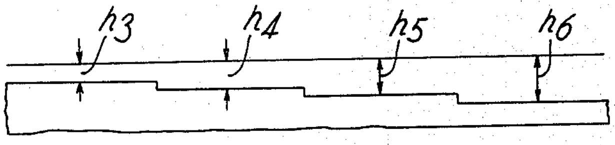
Figure 3B:
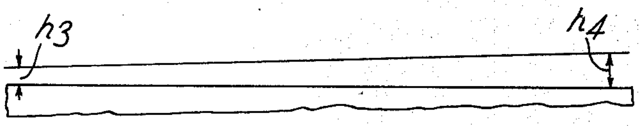

FIG. 1 of the drawings accompanying this application is similar to FIG. 3 of the first-mentioned paper and FIG. 7 of the second-mentioned paper, and shows the theoretical first order diffraction efficiencies as a function of wavelength for different groove heights $h$ given as a fraction of the grating constant $d$, the incidence angle is 3°. For each value of $h$, which is constant for each grating, the curve reaches a theoretical maximum efficiency of about 40% at one wavelength, and falls off rapidly at adjacent wavelengths. Similarly, considerable variations in efficiency occur for a fixed wavelength and a varying angle of incidence. For effective use, a grating must be selected so that its wavelength of maximum efficiency is near the wavelength to be analysed, and hitherto it has been possible to analyse only a small range of wavelengths near the wavelength of maximum efficiency of each grating without a substantial variation in efficiency occurring. Similarly, only a small range of angle of incidence could be used for a constant wavelength.

According to the present invention an x-ray diffraction grating consists of a structure having a surface capable of reflecting x-rays, said surface being grooved so that in cross-section the profile of said surface alternates regularly between geometrically similar lines with the height of the alternation varying significantly over the area of said surface. The variation in height may occur as a single step or a plurality of steps, when the similar lines will be parallel lines. Alternatively, the variation may be continuous, when there will be a slight departure from parallelism. The variation may occur either transverse to the grooving or parallel to the grooving.

The effect of the variation in height is to "smooth out" the curves shown in FIG. 1, giving curves which are of lower maximum efficiency, but which exhibit a smaller variation of efficiency with wavelength in the region of the wavelength of maximum efficiency. Similarly, for a given wavelength, the variation in efficiency with incidence angle will be smaller, and maximum efficiency will be lower.

In FIGS. 2(*a*), 2(*b*), 3(*a*) and 3(*b*), the height of the grooving is exaggerated for clarity.

FIG. 2(*a*) shows part of a plane grating in section transverse to the grooves. As is conventional with phase gratings, the grooves are flat-bottomed, and the width $a$ of each groove equals the land width $b$; $a+b=d$, the grating constant, which may typically have a value of about 1.7 micrometers. In the figure, grooves 10, 11, 12, 13, in one zone are of constant depth or height $h_1$ and grooves 14, 15, 16, 17 in another zone are of constant height $h_2$. In this form of grating there may be as many step variations in height as required; in the extreme, each groove may be a different height from its neighbours. In this type of grating, the similar lines between which the profile of the grating surface alternates are straight and parallel.

Another type of variation is shown in FIG. 2(*b*) in which the groove height varies smoothly from $h_1$ in groove 18 to $h_2$ in groove 19; intermediate grooves are of intermediate heights. It will also be seen that the bottom of each groove is not exactly perpendicular to the groove walls but slopes slightly to follow the same line as the variation in groove height; the angle of slope is greatly exaggerated in the Figure. In this type of grating the similar lines are straight with a very small angle between them.

FIGS. 3(*a*) and 3(*b*) show longitudinal sections through a single groove in different types of grating to those shown in FIGS. 2(*a*) and 2(*b*). In FIG. 3(*b*) the height of the groove varies in three steps between four zones of groove heights $h_3$, $h_4$, $h_5$ and $h_6$, although more or fewer zones may be used, and in FIG. 3(*b* ), the height varies smoothly from $h_3$ near one end to $h_4$ near the other end.

The effect of the variation in height of the grooving is illustrated in FIG. 4(*a*) which shows the theoretical efficiency of the first order diffraction for gratings with 600 grooves per millimeter, an incidence angle of 3°, and a wavelength varying between 0.5 and 5 nanometers. Curve A is the curve for a conventional grating of constant groove height 10 nanometers; the efficiency varies rapidly between about 1 and about 40%. Use of grooving of two heights, 9 and 11 nanometers in two zones of equal area, is shown by curve B, which shows a slight smoothing effect. Use of grooving of 20 different heights between 5.5 and 15 nanometers produces curve C; the variation in efficiency with wavelength is considerably less than when one groove height is used.

The effect of the height variation is further illustrated in FIG. 4(*b*) which shows the theoretical efficiency of the first order diffraction for gratings with 600 grooves per millimeter, an incident wavelength of 1 nanometer, and a varying angle of incidence. Curve D is the curve for a conventionl grating of constant groove depth of 10 nanometers. The efficiency varies rapidly with angle of incidence between about 1% and about 35%. Curve E shows the result if the grating shown in FIG. 2(*a*) is used, with grooves of height 8 and 12 nanometers in two zones of equal area; the variation in efficiency with angle of incidence is lower, about 10 to 15%, i.e. the curve has been smoothed out but the maximum efficiency is considerably lower. Further smoothing can be achieved by the use of a large number of variations in groove height; curve F is the result obtained using a variation in height from 5.5 to 15 nanometers in 19 equal steps with all 20 zones being of equal area.

In general, the mean groove height, total variation in groove height, and if applicable the number and height of the step variations in a grating are chosen according to the range of wavelength or incidence angle in the x-rays to be studied using the grating.

A phase grating according to the present invention may be made by a modification of the method disclosed in U.S. Pat. No. 3,585,121. Briefly, a layer of metal is applied to an optical surface, a groove or series of grooves is ruled in the metal using a smooth tool which does not penetrate to the glass layer, the metal is etched to leave alternate strips of metal and strips of exposed glass, the strips of glass are electrically etched (e.g. ion etched) to produce flat-bottomed grooves, and the remaining metal is etched away. To produce grooves of varying height with a step variation the electrical etching process is applied to different areas of a grating for different lengths of time.

For a smooth variation in height, the grating is moved through the electrical etching process at a smoothly varying speed, so that effective etching time varies smoothly across or along the grooves.

Although FIGS. 2 and 3 show gratings having plane surfaces, the invention is equally applicable to cylindrical, spherical, conical or other curved surfaces. FIGS. 2(*b*) and 3(*b*) show a monotonic change in grooving height, but the height may if required increase then decrease or decrease then increase across or along the grating, or may vary in other ways.

I clain:

1. An x-ray diffraction grating consisting of a structure having a surface capable of reflecting x-rays, said surface being grooved so that in cross-section that profile of said surface alternates regularly between geometrically similar lines with the height of the alternation varying significantly over the area of said surface.

* * * * *